Feb. 20, 1968  A. L. JORDON ET AL  3,370,175
TOXICANT DETECTOR
Filed Jan. 28, 1965  3 Sheets-Sheet 1
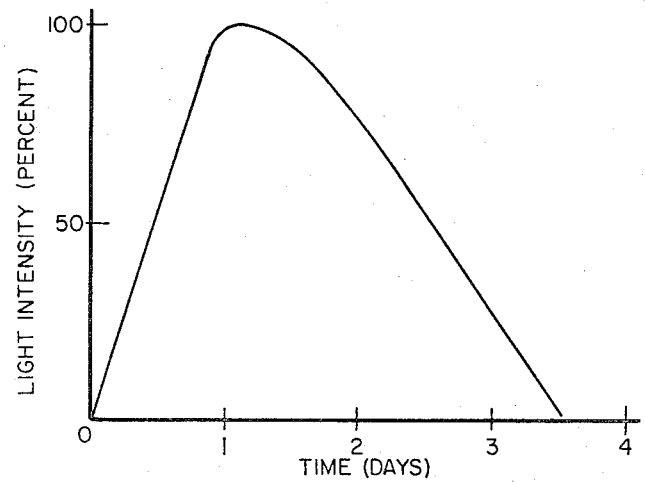
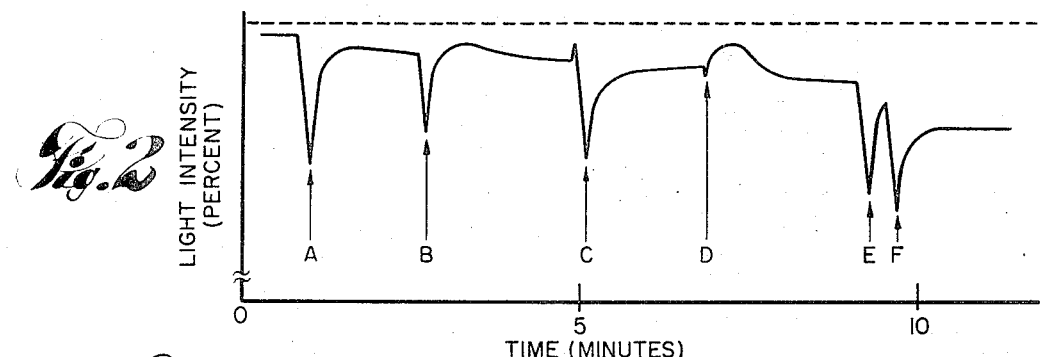
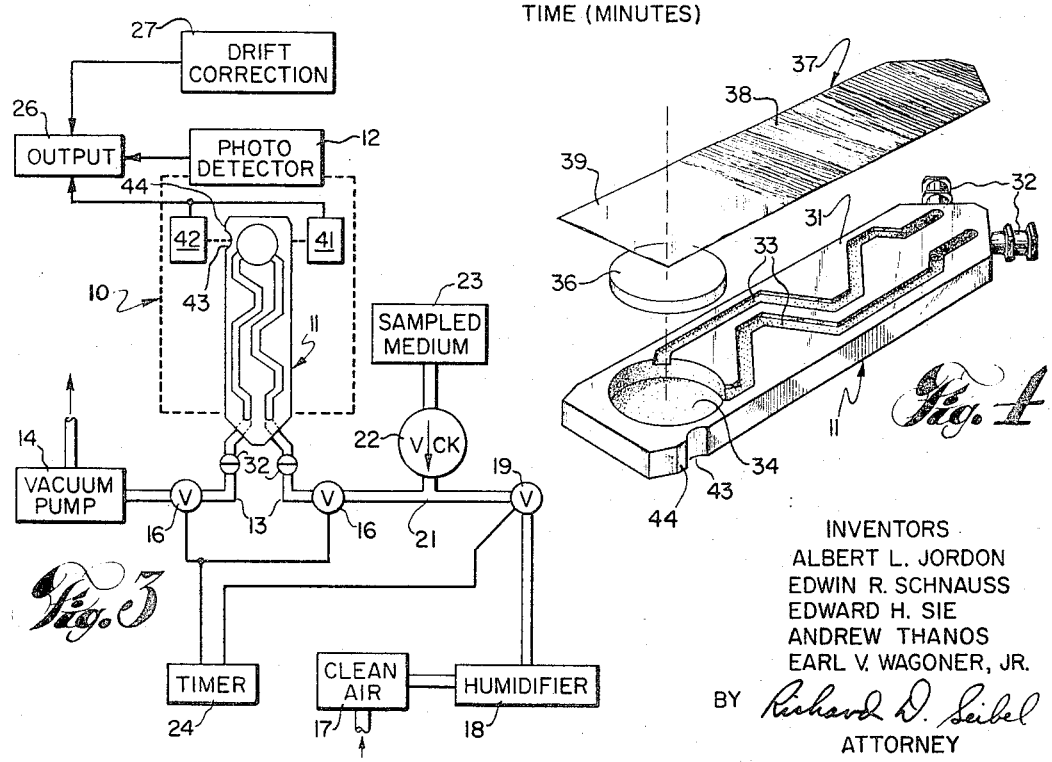
INVENTORS
ALBERT L. JORDON
EDWIN R. SCHNAUSS
EDWARD H. SIE
ANDREW THANOS
EARL V. WAGONER, JR.
BY Richard D. Seibel
ATTORNEY

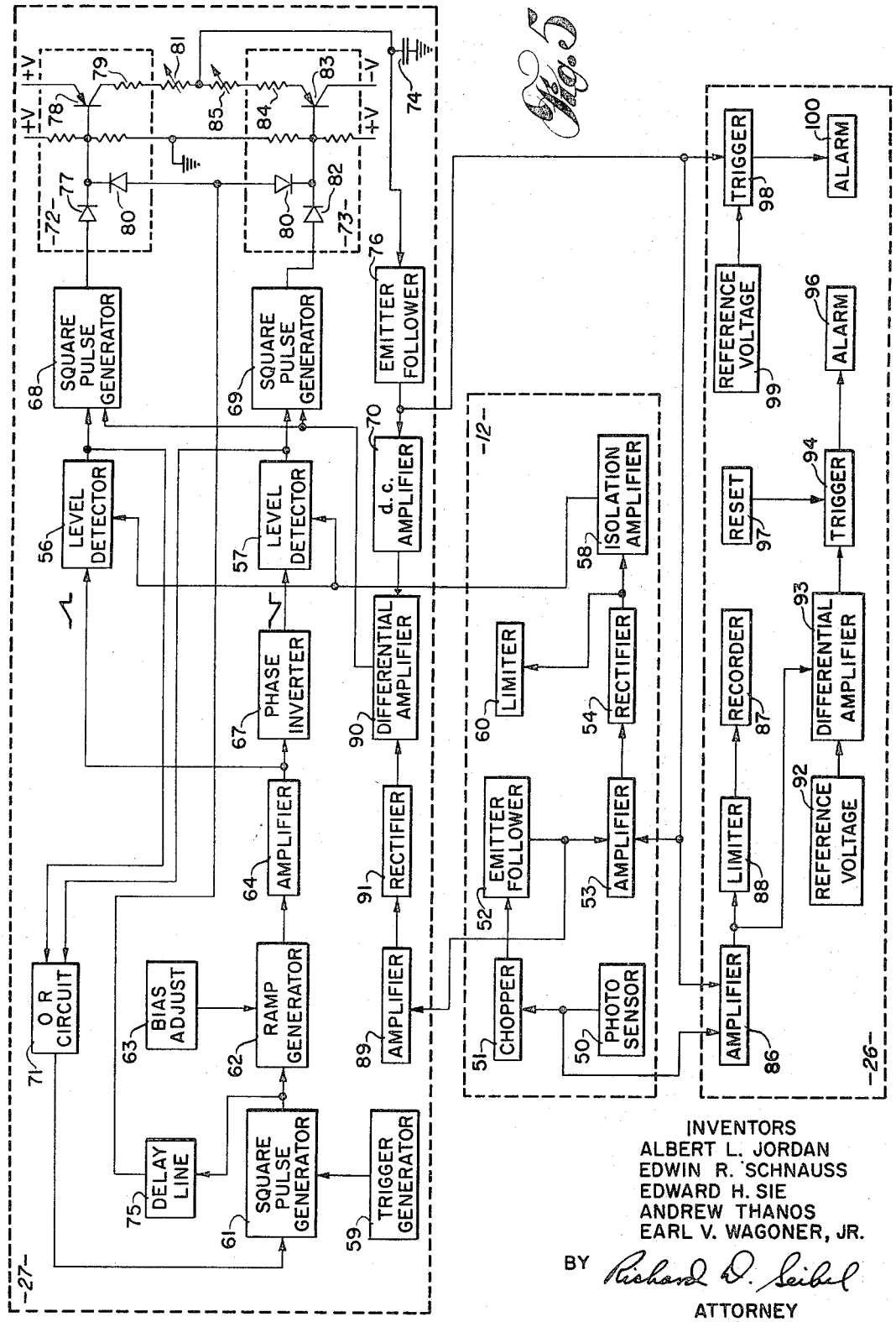

Feb. 20, 1968   A. L. JORDON ET AL   3,370,175
TOXICANT DETECTOR
Filed Jan. 28, 1965   3 Sheets-Sheet 3

INVENTORS
ALBERT L. JORDAN
EDWIN R. SCHNAUSS
EDWARD H. SIE
ANDREW THANOS
EARL V. WAGONER, JR.

BY Richard D. Seibel
ATTORNEY

United States Patent Office 3,370,175
Patented Feb. 20, 1968

3,370,175
TOXICANT DETECTOR
Albert L. Jordon, West Covina, Edwin R. Schnauss and Edward H. Sie, Los Angeles, Andrew Thanos, Redondo Beach, and Earl V. Wagoner, Jr., San Pedro, Calif., assignors to North American Rockwell Corporation, a corporation of Delaware
Filed Jan. 28, 1965, Ser. No. 428,744
24 Claims. (Cl. 250—217)

This invention relates to detection of materials that are toxic.

Rapid detection of toxic agents in gaseous or aerosol form is a substantial problem for many industrial applications to warn personnel of sudden escapes of toxicants or detect accumulations of toxicants in working areas. Several techniques are suitable for detection systems but many of these do not find ready adaptation to field use due to problems of reliability, maintenance, ruggedness, speed of response, size, weight, and the like. In addition most of the systems are highly specific in that they detect the presence of single toxic materials or limited classes of toxic materials. A system capable of detecting small quantities of one toxic agent may be almost completely insensitive to another toxicant which may occur in the same environment.

It is therefore a broad object of this invention to provide a toxicant detector for low concentrations of a broad variety of toxic materials.

A system provided in the practice of this invention is a sophisticated evolution from the procedure of using a canary in coal mines to detect methane. The canary reacts to lower levels of methane concentration than would affect man and its response to the gas is readily detected. Luminous micro-organisms also respond at considerably lower levels of toxicant concentration than those that are harmful to man. When a luminous micro-organism is contacted by a toxicant its metabolism is affected and the intensity of light output is also affected.

Thus in the practice of this invention according to a preferred embodiment there is provided a culture of luminous organisms on a solid nutrient medium. A photodetector is arranged adjacent the luminous culture for detecting light output therefrom. A sampling system is provided for exposing the culture of luminous organisms to air which may contain a low concentration of toxicant. When a toxicant contacts the luminous culture a rapid change in light output occurs which is detected by the photodetector.

In order to provide a toxicant system which can operate automatically and unattended, it is desirable to record the light output from the culture of luminous micro-organisms and also to provide sensing circuitry which detects rapid changes in light output. Since luminous micro-organisms have a limited period of rapid growth in a nutrient, there is a steady change in the light output therefrom. Early in the life of the micro-organism culture there is an increase in light intensity as a function of time up to a certain maximum intensity. Thereafter the light intensity steadily decreases to a level where the culture is no longer useful as a toxicant detector. Because of the change in light output intensity the detection circuitry provided must include a means for continual adjustment of an internal reference state or baseline from which comparatively rapid excursions of light output can be detected. Additionally after exposure to a toxicant, light intensity and variations in light intensity upon exposure to a toxicant from a culture are changed and adjustment to compensate for these changes must also be provided.

Thus in the practice of this invention according to a preferred embodiment there is provided a drift normalizing system including means for repetitively generating voltage ramps that converge on a value of voltage corresponding to light intensity. Coincidence of one of these ramp voltages with the voltage from a photodetector monitoring a culture of luminous organisms provides either a charge or discharge of a capacitor depending on which of the converging ramps first reaches the photodetector amplifier for adjusting the gain thereof to compensate for any change that may have occurred in the steady state light intensity from the luminous culture. A detection system is provided to identify rapid variations in light intensity due to exposure to a toxicant.

Thus it is a broad object of this invention to detect toxicants by means of luminous micro-organisms.

It is another object of this invention to provide a system for detecting rapid excursions from a varying reference.

It is another object of this invention to provide continual level adjustment in an electronic system.

Other objects and many of the attendant advantages of this invention will be readily appreciated as the same becomes better understood by reference to the following detailed description when considered in connection with the accompanying drawings wherein:

FIG. 1 is a typical curve of light intensity as a function of the age of a luminescent culture;

FIG. 2 illustrates typical response curves of light output when a culture of luminous micro-organisms is exposed to a toxicant;

FIG. 3 illustrates a block diagram of a toxicant detector constructed according to the principles of this invention;

FIG. 4 is an exploded view of a micro-organism holder for luminous organism cultures;

FIG. 5 illustrates in greater detail the electronic portion of the block diagram of FIG. 3;

Throughout the drawings like reference numerals refer to like parts.

Figure 6:
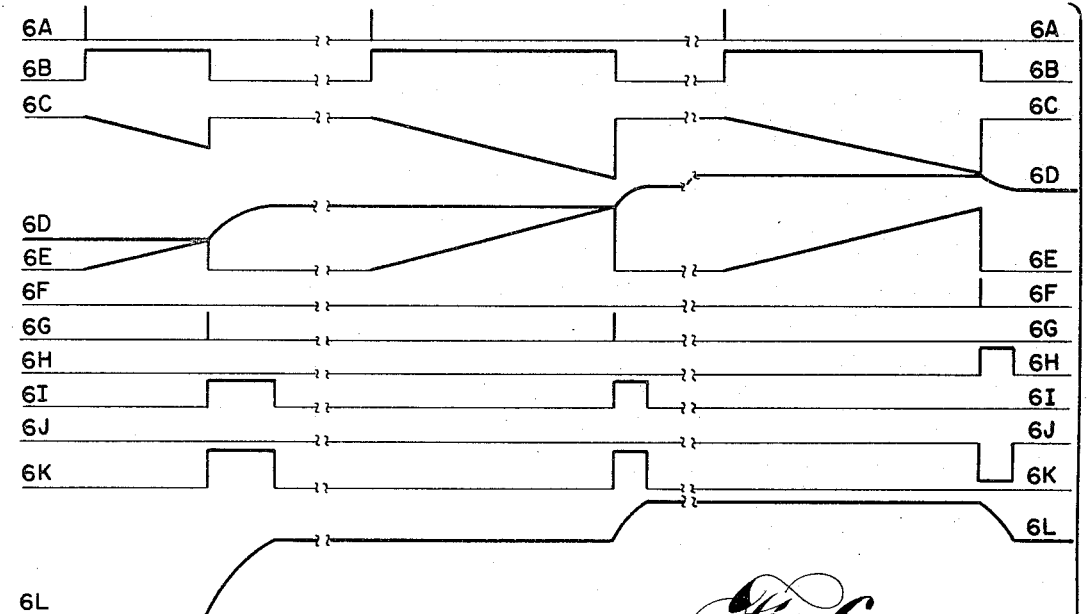
FIG. 6 is a timing diagram of a portion of the diagram of FIG. 5.

When micro-organisms such as bacteria or fungi are exposed to toxicants the respiration and the metabolic processes of the cells are affected. The exact biochemical effect upon the cells has not been elucidated in all instances and the gross effects are dependent on the toxic material and its concentration. It has been observed that aerobic bacteria and fungi that are luminous undergo a change in light output when exposed to toxic gases. The toxicant affects the respiration and metabolism of the luminous micro-organism and usually causes a substantially reversible inhibition of light output. At very low concentrations of some toxicants a stimulation of luminous intensity is observed and in other instances of particular toxicants and concentrations an initial stimulation is followed by inhibition, or vice versa. In any event the reaction of the luminous micro-organism to a toxicant includes a rapid change in light intensity compared with the slow drift of light intensity due to normal metabolic processes.

Several strains of bacteria are known to exhibit strong luminescence in the course of growth. Particularly well identified and readily available species of luminous bacteria includes *Photobacterium fischeri* (formerly known as *Achromobacter fischeri*), *Photobacterium harveyi*, *Photobacterium phosphoreum*, and *Photobacterium pierantonii*. Typical examples of luminous fungi include *Armillaria mellea*, *Panus stipticus*, *Mycelium X*, and many species from the genus Mycena. These and other luminous micro-organisms are available from the American Type Culture Collection, 12301 Parklawn Drive, Rockville, Md., and from many commercial and university laboratories. The micro-organisms employed in the described embodiments of this invention are aerobic or at least facultative aerobes since it is desirable to detect the presence of toxicants in air at a concentration below that level that may be toxic to man.

Stock cultures of bacteria obtained from the American Type Culture Collection are provided on agar slants. These are stoppered vessels such as test tubes or bottles having semi-solid agar nutrient partially filling the tube. The surface of the agar is usually diagonally disposed in the tube to provide an enlarged surface area. The nutrient agar comprises, for example, about 15 to 20 parts of plain agar, from 5 to 15 parts of peptone, 3 to 10 parts of meat extract and 3 to 10 parts glycerol per thousand parts of water. For salt water bacteria the nutrient agar has these ingredients and also includes about 3% sodium chloride, and ½% calcium carbonate. For these bacteria fish or shrimp extract is preferred over meat extract. Bacteria from such a slant are inoculated on a solid agar medium and incubated overnight at room temperature or lower. The luminous cells can likewise be suspended and grown in a nutrient broth comprising substantially the same composition described above without any agar. Aliquots of the broth can be inoculated on agar culture plates, that is, for example, Petri dishes or the like, having a thin layer of solid agar nutrient medium. After incubation of a culture of luminous micro-organisms for about 16–20 hours the culture luminesces freely. The agar nutrient is a gel that for most purposes is solid or at least semi-solid, and is handled as a solid in the practice of this invention.

Luminous fungi are also supplied on an agar slant which may, for example, be made with about 2% agar and 10% bread crumbs. These fungi are conveniently grown in an aqueous broth having about 10% bread crumbs, an artificial nutrient, or cooked cherry broth. Fungi have much slower development than bacteria, hence require an incubation period of a week or more before sufficient light intensity is produced from the culture for use in the practice of this invention. Samples to be employed in the toxicant detector are preferably grown on a solid agar nutrient comprising, for example, 2% agar and 10% bread crumbs in water. These are conveniently incubated for about a week at room temperature before being employed in the toxicant detector.

Similarly cultures of micro-organisms can be grown from lyophylized samples of micro-organisms as will be apparent to one skilled in the art.

It is preferred that the luminous micro-organisms be on a solid substrate so that good contact occurs between air and substantially all of the culture. Since the micro-organisms are at least facultative aerobes, no luminous light output is obtained in the absence of air. Thus cultures grown in a nutrient broth deplete the available oxygen in a short time and do not luminesce except at the surface or unless the broth is continually aerated. For this reason, the light output from a culture in a nutrient broth is not sufficiently stable for use in a toxicant detector.

In addition, exposure of a culture in a liquid nutrient broth to air suspected of containing a toxicant is obtained only with great difficulty. Passing the suspected air over the surface may cause a decrease in light intensity by micro-organisms close to the surface, but deeper lying micro-organisms that are luminescent because of diffused oxygen in the water will not be affected by a toxicant until it has also diffused to this depth. This is a somewhat slower process than the inhibition of light due to a toxicant and it is difficult to obtain an unambiguous indication of the presence of a toxicant. Additionally it should be noted that if the toxicant is insoluble in the nutrient broth, inhibition cannot occur except at the air-liquid interface and the sensitivity of the technique is seriously compromised. On the other hand, if the toxicant is soluble in the nutrient broth, quantities remain in solution for a substantial time and very long recovery times for the luminous culture are observed due to continued inhibition by the toxicant. For these reasons it is preferred to employ a culture of luminous micro-organisms on a solid substrate for exposure to air suspected of containing a toxicant.

The solid substrate is preferably a nutrient medium so that the culture has a long life while in use in a toxicant detector. This nutrient is preferably an agar gel as has been described. Another suitable technique for obtaining a culture of luminous micro-organisms on a solid substrate is to grow the culture in a suitable nutrient broth until an acceptable concentration of viable organisms are present. The both is then filtered through a filter pad having sufficiently small pores to pass the liquid and retain the micro-organism. The filter pad having the micro-organisms thereon is then employed for detection of toxicant in the same manner as an agar culture plate is used. Sufficient nutrient and moisture are retained in the filter pad to maintain the culture in a luminous condition and sensitive to toxicants for several hours. Often the luminescence can be revived after deterioration by filtering additional nutrient broth through the pad although it is preferred to replace the filter pad when the light output decreases below a usable value. The technique of empolying filtered organisms for toxicant detection is particularly well suited for luminous fungi which have a lower metabolism rate than that of luminous bacteria.

A culture of luminous micro-organisms commences with a relatively small number of individual cells in the culture and the population increases during incubation. It is found that the increase in light intensity from a culture in the early stages of growth is substantially parallel to the colony growth. In later stages of growth the luminou intensity diminishes despite continued growth of the culture. The decrease in luminescence is usually ascribed to depletion of essential nutrients for continued luminescence or accumulation of inhibitory waste products.

FIG. 1 illustrates the relative light intensity of luminescence from a culture of micro-organisms in percent of maximum as a function of time. The illustrated curve is typical of the light intensity observed from a culture of luminous bacteria grown on a solid nutrient substrate. Cultures in aqueous broth have substantially different luminescence curves because of the greater mobility of materials in the liquid medium than in the semi-solid medium of an agar gel. In the illustrated curve the maximum intensity of luminescence is reached in about one day of incubation time and the luminescence decreases to a relatively low value in about three days after inoculation on the solid culture medium. A culture having a light output as a function of time as illustrated in FIG. 1 has sufficient light intensity and sufficient sensitivity to toxicants to be useful in a toxicant detector throughout the second day of its lifetime. It is observed that some strains of micro-organisms and some nutrient substrates give curves having different time periods but of substantially the same general shape. Thus some cultures of luminous bacteria have an appreciable luminescence for five days or longer when incubated at room temperature and are effective in detecting toxicants for two or three days during this time. The length of time that a culture is luminescent and its effective lifetime as a toxicant sensor are greatly prolonged when the culture is maintained at a temperature below the temperature for optimum growth. Thus, for example, a culture having two days effective lifetime at the optimum growth temperature of 22° C. is effective for use in a toxicant detector for as long as five days when maintained at 10 to 15° C. This lowered temperature is maintained during incubation and also during use in a toxicant detector. A detection system as described hereinafter is sufficiently sensitive to detect low concentrations of toxicants with a culture at a lower than optimum temperature. The slower growing cultures of fungi have longer periods of usefulness than bacteria but also require longer incubation times to reach a sufficient light intensity to be useful. The general shape of a typical light intensity versus time curve for fungi is similar to that illustrated for bacteria.

A typical culture of luminous bacteria can be employed for detecting toxicants after about one day incubation. In some situations it may be impractical to prepare fresh cultures daily, and it is also desirable to have replacement cultures available at all times in case of damage or deterioration of a culture in a toxicant detector. Cultures can readily be incubated for a period of less than a day and stored for several days at about 5° C. Upon warming to room temperature, which is in most instances about the optimum temperature for growth, full luminescence is obtained from the culture. The light intensity is usually greater than when first stored indicating that some colony growth has occurred at this temperature. Another technique which has been found useful is to incubate the culture for a few hours to obtain a significant number of cells in the colony, and freeze the culture at −20° C. The frozen culture is warmed and incubated about 24 hours at room temperature before use in a toxicant detector. Cultures have been found luminescent and sensitive to toxicants after storage for 23 days at −20° C.

Not only do the cultures exhibit diminished light output as a function of time due to normal aging of the culture but it is also observed that there is some irreversible inhibition of luminescence upon repeated exposure of the culture to toxicants. It has been found, however, that cultures of luminous bacteria may be exposed to as many as 100 successive exposures of toxicant without destroying the usefulness of the culture in a toxicant detector. The damage to the culture is, of course, dependent on the concentration of the toxicant to which it is exposed, very high concentrations for appreciable time periods tending to cause very high inhibition of luminescence.

As a general rule when a luminous culture of microorganisms such as bacteria is exposed to a toxicant the light intensity from the culture is decreased. In bacteria the decrease in light intensity is very rapid. Within one or two seconds after exposure to a toxicant the light intensity is greatly reduced. It is also observed that the inhibition of luminescence is largely reversible and there is a substantial return to the original light intensity in about 10 to 15 seconds after the toxic agent is removed from the vicinity of the culture. As previously mentioned the recovery is usually not as large as the original inhibition and a permanent shift in the total light intensity from the culture is observed after brief exposure to a toxicant. At very low concentrations of some toxicants it is sometimes observed that a stimulation of light intensity occurs followed by recovery of the culture to substantially the original light intensity after the toxicant is removed. Such a reaction to a toxicant may be employed to detect low concentrations of toxicant, however, it is considered less reliable than the inhibitions accompanying higher concentrations of the same toxicant.

FIG. 2 illustrates typical light intensity data obtained from cultures of aerobic luminous bacteria on a solid nutrient medium. A dashed curve is shown in FIG. 2 as typical of the light intensity of a culture of luminous bacteria that is not exposed to any toxic materials. A solid curve is presented which shows certain typical variations in light intensity of a culture of luminous bacteria upon brief exposure to air containing, a toxicant. Thus, for example, at time A in FIG. 2 a small quantity of air containing a toxicant is passed over a culture of luminous bacteria on a semi-solid nutrient substrate. A very rapid decrease in light intensity is observed and after the toxicant is removed by purging with clean air, the light intensity quickly recovers to a new steady state value which, in this instance, has less light intensity than before exposure to the toxicant.

At the time B in FIG. 2 a small amount of air having a relatively lower concentration of toxicant is passed over the surface of a culture of luminous bacteria on a semi-solid medium. An initial decrease in light intensity rapidly occurs. After removal of the toxicant from the culture the light intensity rises and exceeds the original light intensity for a short time before diminishing to a new steady state. At time C in FIG. 2 a different toxicant is added to the culture and a very sharp spike of increased light intensity precedes a rapid decrease in light intensity. Such curves are observed with toxicants that show a stimulation of luminescence and the initial spike is apparently due to very low concentrations of the toxicant which first reach the luminous culture. After removal of the toxicant the light intensity returns to a new steady state value. At time D in FIG. 2 a very low concentration of toxicant which actually stimulates light intensity is added to a culture. A relatively fast increase in light intensity is observed of appreciably less magnitude than the decreases observed for the same toxicant at higher concentrations and after removal of the toxicant the culture returns to a new steady state of luminescence which is usually lower than the original light intensity.

At times E and F of FIG. 2 the culture is exposed to a toxicant of the type that produced a curve of the type illustrated at time A. The second exposure to the toxicant follows the first exposure before complete recovery of the luminescence from the culture has occurred. Even in this instance a second rapid decrease in the light intensity from the culture is observed followed by a normal return to a new steady state of light intensity after removal of the toxicant from the presence of the culture.

When employing a detector system as provided according to the practice of this invention response must be made to variations in light intensity of the various type illustrated and the system must also be insensitive to the drift and displacements in the light intensity due to aging and repeated exposure to toxicants. A common characteristic of the illustrated curves of light intensity after exposure to toxicant is the rapid change in light intensity observed and the short recovery time of the bacteria to a relatively steady state luminescence. It has been observed that repeated exposure of a culture of bacteria to toxicants gives some cumulative effect upon light intensity; the overall light intensity of the culture diminishing upon repeated exposure. The system provided according to a preferred embodiment has included therein means for normalizing the drift and displacement naturally occurring in the employment of luminous organisms for detection of toxicants.

FIG. 3 illustrates in block diagram form a toxicant detector embodying the principles of this invention. Thus, according to a preferred embodiment there is provided a light-tight enclosure 10, also illustrated in FIG. 7, that includes a micro-organism holder 11 and a photodetector 12. The photodetector is arranged so as to have a detecting aperture 12a in close proximity to a culture of luminous organisms in a chamber 34 on the micro-organism holder 11. In this way any light generated by the organisms is detected by the photodetector and employed for the detection of toxicants. It is preferred to have the photodetector close to the luminous culture so that the absolute light intensity on the sensitive aperture of the photodetector is as high as possible to give good signal to noise ratio. The light-tight enclosure 10 is provided around the micro-organism holder 11 and photodetector 12 so that no stray light from outside the instrument will interfere with the operation of the photodetector. A tight fitting aperture 15 is provided in the light-tight enclosure 11 for inserting the micro-organism holder adjacent the photodetector and still excluding light from the instrument.

Conduits 13 are connected to the micro-organism holder so that air or a medium which is suspected of containing a toxicant may be passed over the luminous culture. It is preferred that these conduits and other gas handling portions of the apparatus be capillary tubing or very small diameter tubing so that the volumes of gases to which the culture is exposed are small. By using small quantities of gas the effective life of the luminous culture is prolonged and the speed of response of the system is enhanced. A vacuum pump 14 (FIG. 3) is provided for drawing gases through the micro-organism holder. By drawing gases through rather than forcing with a pump, the effect of vapors from the pump fluid on light output is completely avoided. Normally closed valves 16 which are ganged together are provided on either side of the micro-organism holder so that it is isolated when not in use.

A source of clean air 17 free of toxic materials such as, for example, a small tank of compressed air, is provided for purging the system before and after sampling of a medium suspected of containing a toxicant. A humidifier 18 is also provided in connection with the clean air supply so that air passed through the micro-organism holder has a high relative humidity. It is preferred that the humidity be as high as 100% and satisfactory operation has been obtained with a simple humidifier comprising a chamber filled with wet cotton through which all of the air must pass. Since small volumes of air and low flow rates are involved, such a humidifier provides a high relative humidity and prolonged operation without servicing. Other humidifiers can readily be provided by one skilled in the art.

Humidified air is employed in the toxicant detector to minimize the loss of moisture from the agar medium on which the luminous culture is grown. If moisture is depleted from the agar, the metabolism of the culture is affected and the total luminescence is decreased. It is also found that the luminescence from the micro-organisms is dependent on temperature and if dry air is passed over the luminous culture, moisture is extracted which causes a chilling of the surface and a consequent decrease in light intensity. For this reason when sampling extremely dry mediums it may be desirable to humidify the sampled material before passing over the luminous culture to prevent false indications of the presence of toxicant which are due to nothing more than slight drying of the culture medium. If the toxicant expected is soluble in or decomposed by water, it is undesirable to humidify the sample gas and it is necessary to adjust a reference voltage in the alarm circuitry described hereinafter to a level which accounts for both the drying effect of unhumidified sample gas and the presence of toxicant.

A normally open valve 19 is provided between the humidifier 18 and a junction point 21. Also connected to the junction point 21 is a check valve 22. This check valve is lightly spring loaded so as to normally remain closed in the presence of a small pressure gradient. The check valve 22 is connected to a sampled medium 23 which in some instances may be an open environment or in other instances may be a closed system in which the presence of a toxicant may appear. The nature of the sampled medium will depend upon the use to which the toxicant detector is put.

Since the micro-organisms employed in the practice of this invention are aerobic, air is employed to purge the system and would also be the base for the medium suspected of containing a toxicant. It is found that the luminous light output from micro-organisms is insensitive to changes in nitrogen concentration and is relatively unaffected by lowered oxygen pressures down to as little as about 2 mm. Hg partial pressure. Therefore, although air is preferred as the base, other oxygen containing mixtures can also be employed. Thus, for example, the gas employed by divers is a mixture of helium and oxygen and the presence of toxicant in this mixture is readily detected by use of luminous micro-organisms. Air is therefore considered as any breathable mixture of gases for purposes of the practice of this invention. Toxicants present in the air may be in the form of gas or vapor therein or an aerosol dispersion of toxic material.

In a preferred embodiment the valves 16 and 19 are solenoid operated valves which are sequentially operated by a timer 24. The timer is arranged to provide a cycle of operation for some arbitrarily selected interval depending on the use to which the toxicant detector is put. Thus, for example, it may be desirable to sample the medium 23 at one minute intervals. In this instance the timer 24 would actuate one cycle each minute for sampling the medium 23. For each cycle the timer first opens the normally closed valves 16 which permits clean air from the clean air supply 17 to pass through the humidifier 18 and the normally open valve 19 over the luminous culture in the micro-organism holder 11. After a short time interval, preferably only a few seconds, the normally open valve 19 is closed by the timer 24. This stops the flow of clean air through the humidifier and the pressure at the junction point 21 begins to drop due to the action of the vacuum pump 14. When a small pressure drop is present the spring loaded check valve 22 automatically opens and a sample of the medium 23 is passed over the luminous culture in the micro-organism holder. After about one or two seconds the valve 19 is again opened and clean humidified air is permitted to enter the micro-organism holder. The availability of this air raises the pressure at the junction point 21 and the check valve 22 closes, ceasing the flow of gas from the sampled medium 23. Clean humidified air is passed over the luminous culture for a few seconds to purge any remaining toxicant from the system at which time the valves 16 are again closed and the micro-organism holder isolated.

Thus a cycle of exposure of the organism to a toxicant commences with the organism in a steady state static atmosphere of humidified air in the micro-organism holder. The sample is subjected to a few seconds of dynamic humidified air flow so that if any change in light output is due to dynamic conditions in the micro-organism holder, a new steady state will be established before any toxicant is introduced to the culture. When a new steady state is reached a small sample of air suspected of containing a toxicant is passed over the luminous culture. After only a few seconds of exposure to the suspected air the micro-organism holder is purged with clean humidified air to remove any traces of toxicant and restore the culture to a steady state of luminescence. The flowing air is then cut off and the culture permitted to reach a steady state of light intensity in static air until time for the next cycle to commence.

Light from the culture of luminous organisms is detected by the photodetector 12 and applied to output circuitry which provides a record of the light intensity as a function of time and also, if a toxicant is present, provides a suitable alarm. A drift correction system 27 is also provided to adjust the output circuitry 26 to account for natural aging of the culture during use and compensate for cumulative changes in luminescence due to repeated exposure to toxicants.

FIG. 4 illustrates in an exploded view a micro-organism holder 11 which has been found useful in the practice of this invention. This holder comprises a substantially rectangular plate 31 preferably made of an inert thermosetting plastic material such as a phenolformaldehyde resin. At one end of the plate 31 there are provided fittings 32 which permit connection of the holder to the conduits 13 (FIG. 3) for admitting gas to the organism holder. Two channels 33 are formed in the surface of the plate for passing gas between the fittings 32 and a chamber 34. These channels 33 are preferably made with a tortuous path to serve as a light baffle and prevent stray light from entering the chamber 34. The chamber 34 is preferably a circular depression in the plate 31 and serves to accommodate an agar disk 36. The agar disk includes a culture of luminous micro-organisms on the surface thereof. It has been found that an agar disk less than one-tenth inch thick is sufficient to provide nutrient and moisture for the entire useful life of a culture of luminous bacteria.

The surface of the plate 31 is covered with a thin film 37 which is adhesively bonded to the plastic plate 31. It has been found convenient to employ a plastic film such as cellophane or Mylar (polyethylene terephthalate) for covering the channels 33 and the chamber 34. Preferably the film 37 is opaque in a portion 38 which covers the channels 33 and is transparent in a portion 39 which covers the chamber 34. This helps prevent stray light from entering the instrument and yet permits exposure of the luminous culture to the photodetector which is conveniently arranged just on the opposite side of the transparent film from the luminous culture. The film over the surface of the plate 31 limits the portion of the instrument to which gas suspected of containing a toxicant is exposed and also limits the exposure of the luminous culture to ambient conditions.

Figure 7:
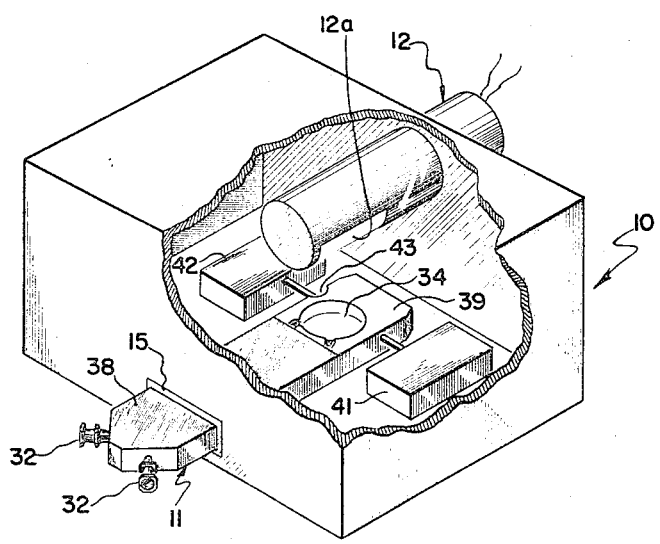
FIG. 7 illustrates a cutaway view of a light tight enclosure useful in the practice of this invention.

As illustrated in FIGS. 3 and 7 there are provided switches 41 and 42 engaging with the organism holder 11. The switch 41 is actuated by one side of the organism holder and the other switch 42 engages with a notch 43 on the opposite side of the holder. The two switches are connected in series with the switch 41 being normally open and the switch 42 normally closed. As an organism holder is inserted in the light tight enclosure a side portion 44 on the holder first opens the switch 42, then the opposite side of the holder closes the switch 41. As the holder is further inserted the switch 42 engages the notch 43 and is again closed completing a circuit so that the toxicant detector is in operating condition. By employing two switches arranged as described, it is assured that an organism holder is inserted into the light tight enclosure before operation and also that the organism holder is correctly oriented with the transparent window facing the detecting aperture of the photodetector. It is apparent that other keying arrangements can be devised to perform this function, however, the illustrated arrangement is preferred since the engagement of the switch 42 with the notch 43 also provides a detent that helps retain the organism holder in place in the light tight enclosure.

As previously described the light intensity from the culture of luminous organisms has a variation in magnitude as a function of the life of the culture. In addition after exposure of the culture to a toxicant it is usually found that the absolute light intensity after recovery is not the same as the light intensity before exposure. Detection of toxicants depends upon a relatively rapid change in the light intensity due to the effect of the toxicant on the culture and any shift in the absolute light intensity might be erroneously interpreted as indicating the presence of a toxicant unless continual adjustment for drift of absolute light intensity is provided so that light output after exposure to air suspected of containing a toxicant is compared with a normalized light output corrected for changes in absolute light output.

A preferred system for correcting drift and other normal changes in light intensity, distinguishing rapid changes of light output from normal changes, and an output system is illustrated in FIG. 5. As illustrated therein according to a preferred embodiment the light intensity from a culture of luminous organisms is detected by a photo sensor 50. A photomultiplier is the preferred photo sensor because of the light levels involved and the spectral range. The light intensity from cultures of luminous micro-organisms is in the range from about 0.008 to 0.01 foot-Lambert. The micro-organisms demonstrating useful luminescence are in a spectral range from about 460 to 550 millimicrons. Photomultipliers have response from about 300 to 600 millimicrons and also have a large gain for a small change in intensity in this range, hence are a preferred photo sensor. The output of the photo sensor is an electrical signal that is chopped by a chopper 51 and then isolated by an emitter follower 52. The output of the chopper after passing through the emitter follower is amplified by an A.C. coupled amplifier 53, rectified by a rectifier 54, and applied through an isolation amplifier 58 to each of two level detectors or voltage comparators 56 and 57 in the drift correction system 27. A voltage limiter 60 is provided in combination with this circuit to prevent voltage overshoots.

A trigger generator 59 such as a free running multivibrator having a differentiated output is employed to generate a trigger signal every two to five seconds or at some other interval as may be provided by a manual adjustment. The time period of the trigger generator is selected so as to generate from about three to five trigger pulses during the natural recovery time of the culture of luminous organisms after exposure to a toxicant. If an appreciably greater number of pulses is provided in the recovery time period the drift correction may be so rapid as to completely mask relatively rapid excursions in light which are due to exposure to a toxicant. If appreciably fewer pulses are generated during this time interval the drift correction may be insufficient and false alarms may result.

The trigger pulses from the free running trigger generator 59 are applied as a trigger to a square pulse generator 61, such as a bistable multivibrator, which is switched by the trigger pulse to one condition and remains in this condition until returned to its original condition by a second signal as hereinafter described. The result is a substantially square pulse of indefinite length initiated by the trigger pulse from the trigger generator 59 and terminated by a signal from the level detectors as hereinafter described.

The square pulse generated by the generator 61 is employed to enable a sawtooth or ramp generator 62 that generates a linearly increasing voltage as a function of time. The voltage level from which the ramp generated by the ramp generator commences is determined by a bias adjustment 63 and the duration of the ramp is determined by the duration of the square pulse from the pulse generator 61. The positive going ramp from the ramp generator 62 is amplified by an amplifier 64 and the amplified ramp is applied as a second input to the level detector 56 to which the output of the photodetector 12 is applied as a first input. The amplified ramp from the amplifier 64 is also applied to a phase inverter 67 which inverts the ramp and biases it to a higher voltage. The output of the phase inverter is thus a negative going ramp beginning at a higher voltage level than the ramp from the amplifier 64 and synchronized with the positive going ramp. Since the ramp from the amplifier 64 is increasing from one voltage and the inverted ramp from the phase inverter 67 is decreasing from a higher voltage, the two voltage ramps are converging.

The voltage levels from which the two synchronous converging ramps initiate are chosen so as to be beyond the extremes of photo sensor output that may be anticipated from a particular culture. Thus, the positive going ramp commences from a value less than the lowest useful light output and the negative going ramp commences from a value greater than the photo sensor output from the brightest culture anticipated. By this means it is assured that the photodetector output is always between the converging ramps and as described hereinafter is normalized to a value approximately symmetrically between the converging ramps. The negative going ramp from the phase inverter 67 is applied as a second input to the level detector 57 to which the output of the photodetector 12 is applied as a first input.

The timing diagram in FIG. 6 illustrates the voltages occurring in various portions of the system illustrated in FIG. 5. FIG. 6A illustrates the output from the trigger generator 59 which comprises trigger pulses occurring repetitively as a function of time. The pulse generated trigger a square wave pulse as illustrated in 6B from the square pulse generator 61. FIG. 6C illustrates a negative going ramp from the phase inverter 67 and FIG. 6E illustrates a positive going ramp from the amplifier 64. These two ramps are synchronous and converge toward a voltage level as illustrated in FIG. 6D which represents output from the photodetector 12 after amplification. The output voltage illustrated in FIG. 6D varies depending on changes in light intensity from the culture and is adjusted by the described system to remain approximately midway between the converging ramps except upon exposure to a toxicant.

In the first two series of pulses illustrated in FIG. 6, the magnitude of the positive going ramp 6E reaches concidence with the magnitude of the photodetector voltage as illustrated in 6D before the magnitude of the negative going ramp as illustrated in 6C reaches coincidence. The reaching of coincidence in voltage causes an output signal pulse, FIG. 6G, from the level detector 56 (FIG. 5). This output signal is applied to a square pulse generator 68 such as a monostable multivibrator. A second square pulse generator 69 substantially the same as the generator 68 is connected with the level detector 57 for activation in the instance when coincidence with the photodetector voltage first occurs with the voltage of the negative going ramp. The outputs from the level detectors or voltage comparators 56 and 57 are also fed to an OR circuit 71 and thereby applied to the square pulse generator 61 to terminate the square pulse generated thereby when either of the level detectors gives an output pulse. The termination of the square pulse also terminates the ramps by disabling the ramp generator 62, thereby preventing the other of the two ramps (negative going in this instance) from reaching coincidence with the photodetector voltage after one of the ramps has reached coincidence.

The square pulse generators 68 and 69 are connected to current pulse circuits 72 and 73 respectively. The two current pulse circuits 72 and 73 are in turn connected to a storage capacitor 74 which is also connected to ground. The state of charge voltage of the capacitor 74 is employed as feedback via an emitter follower 76 as hereinafter described.

Referring again to the sequence of events illustrated in FIG. 6, coincidence of the positive going ramp as illustrated in FIG. 6E with the photodetector signal as illustrated in 6D causes a pulse from the level detector 56 as indicated in FIG. 6G. This pulse, in addition to terminating the pulse from generator 61, is also applied to trigger the pulse generator 68 which produces a substantially square pulse having a certain controlled "on" time as indicated in FIG. 6I and described more fully hereinafter.

The square pulse from the square pulse generator 68 is applied to the current pulse circuit 72. This square pulse passes through a diode 77 and is applied to the base of a siutably biased transistor 78 so as to cause the transistor to conduct only for a time interval corresponding to the length of the pulse as indicated in FIG. 6K. Current flowing from a positive voltage supply through the transistor 78 passes through a limiting resistor 79 and an adjustable resistor 81 to charge the capacitor 74. This current flowing for the time interval of the pulse length raises the voltage on the capacitor as indicated in FIG. 6L.

The increase of voltage on the capacitor 74 due to the charging current from the current pulse generator 72 is coupled to the amplifier 53 in the photodetector circuit 12 through the emitter follower 76. This voltage is applied to increase the gain of the amplifier and hence increase the output of the photodetector 12 that is applied to the level detectors 56 and 57. This result is illustrated in the photodetector output line in FIG. 6D of the timing diagram.

In a similar manner a second set of conditions is also illustrated in the timing diagram of FIG. 6 after the second break in the time scale thereof. In this example of operation of the draft correction circuit 27 the situation is represented wherein the photodetector output is at a level such that this signal reaches coincidence with the magnitude of the negative going ramp before reaching coincidence with the positive going ramp. In this set of conditions a pulse from the free running trigger generator 59, as illustrated in FIG. 6A, initiates a square pulse as illustrated in FIG. 6B from the square pulse generator 61. As previously described two ramps are enabled for the duration of the square pulse. These two ramps have opposite directions and tend to converge on the voltage from the photodetector as illustrated in FIGS. 6C–6E. In the illustrated circumstances the voltage of the negative going ramp reaches coincidence with the photodetector voltage before the positive going ramp reaches coincidence. This coincidence is detected by the level detector 57 which generates a pulse as indicated in FIG. 6G. This pulse activates the square pulse generator 69 producing a pulse as indicated in FIG. 6H which has an "on" time determined as hereinafter described. The pulse from the level detector 57 is also applied through OR gate 71 to the square pulse generator 61 to determine the square pulse and hence disable the ramp generator 62.

The pulse from the square pulse generator 69 is applied to the current pulse circuit 73. This square pulse passes through a diode 82 (FIG. 5) and is applied to the base of a suitably biased transistor 83 so as to cause the transistor to conductor for a time interval corresponding to the length of the square pulse as indicated in FIG. 6J. Current flowing through the transistor to a negative voltage supply passes through a limiting resistor 84 and an adjustable resistor 85 to decrease the charge on the capacitor 74 as indicated in FIG. 6L. In a similar manner as previously described the state of charge of the capacitor 74 is applied to the amplifier 53 through the emitter follower 76 to decrease the gain of the amplifier 53 and the output voltage from the photodetector as indicated in FIG. 6D. Thus the charge on the capacitor is increased to a relatively higher voltage when the light output from a culture is low and the charge is decreased to a relatively lower voltage when the light output is high, and the gain of the amplifier is high when light output is low and the gain is low when light output is high. Manually adjustable resistors 81 and 85 are provided for current control for varying the rate of charge and discharge of the capacitor 74 during the time corresponding to the pulse of current for varying the rate of correction for drift if desired. The capacitor 74 is preferably large so that leakage during the time between trigger pulses is insignificant.

The voltage or state of charge of the capacitor 74 is isolated by an emitter follower 76 and is employed as feedback in the drift correction system for varying the rate of charging or discharging the capacitor by varying the time that the current pulse generators 72 and 73 conduct. The voltage on the capacitor 74 is applied by way of the aforementioned emitter follower 76 and a D.C. amplifier 70 to a differential amplifier 90 as one input. The D.C. amplifier 70 serves principally to invert the signal from the storage capacitor 74 before applying this signal to the differential amplifier 90. Another input to the differential amplifier is an amplified and rectified output of the photodetector 12 as provided by a constant gain amplifier 89 having the output of the emitter follower 52 as the input. The output of the amplifier 89 is rectified by a rectifier 91 before being applied to the differential amplifier 90. The two inputs are compared by the differential amplifier 90 to produce an output signal representative of the difference between the state of charge of the capacitor 74 and the output of the photo sensor 50 and hence the luminous output of a culture of microorganisms. This output signal, suitably biased, is applied to each of the square pulse generators 68 and 69 for varying the length of the pulse generated thereby.

The square pulse generators 68 and 69 are, for example, monostable multivibrators and the differential amplifier output is applied as a bias thereto to vary the time constant of the multivibrator, hence its "on" time or the time interval of the pulse. The bias is such that when a large difference is present between the photodetector output and the capacitor voltage, a relatively longer time pulse is produced by the generators 68 and 68 and when a small difference is present between the photodetector output and the capacitor voltage, a relatively shorter time pulse is generated. The amount of charge or discharge of the capacitor 74 is directly related to the pulse length from the generators 68 and 69 since the conductance time of the transistors 78 and 83 is regulated by the pulse length. Thus, the state of charge of the capacitor 74 compared with the photo sensor output serves as feedback for varying the rate of charging or discharging and varying the amount of baseline correction obtained for each cycle of operation of the drift correction circuitry. The feedback thus serves to minimize the difference between the capacitor voltage and the photo sensor output voltage.

The effect of the feedback is illustrated in the timing diagram of FIG. 6. In the first example illustrated therein the photodetector output level is low and a substantial difference (not illustrated) exists between this value and the voltage on the capacitor 74. This results in a relatively long pulse from the pulse generator 68, as illustrated in the first sequence of events shown in FIG. 6I, hence a relatively long pulse from the current pulse generator 72 as illustrated in this same sequence in FIG. 6K. The long pulse gives a substantial charge to the capacitor 74 as illustrated in FIG. 6L. Since the voltage on the capacitor 74 controls the gain on the amplifier 53, the photodetector output as illustrated in FIG. 6D has a relatively large change toward a position symmetrical between the converging ramps as illustrated in FIG. 6C and FIG. 6E. Similarly in the second example illustrated in FIG. 6, the photodetector output level and the voltage on the capacitor are of relatively closer magnitude, and the pulse from the generator 68 as illustrated in the second sequence in FIG. 6I is relatively shorter. The concomitantly shorter pulse from the current pulse generator 72 gives a shorter charging time on the capacitor 74, hence less change in the state of charge thereon and less change in the gain of the amplifier 53. The bias on the pulse generators 68 and 69 is normalized so that when the photo sensor output and the capacitor voltage are substantially equivalent, the pulse length is extremely short so that very little, if any, change occurs in the state of charge of the capacitor or in the amplifier gain.

The pulse from the square pulse generator 61 is also coupled to the current pulse circuits 72 and 73 by diodes 80 for enabling the current pulse circuits for a limited time. The square pulse from the generator 61 is applied to the bases of the transistors 78 and 83 as a bias to enable conduction only during the time this square pulse and a square pulse from one of the generators 68 or 69 are both present. Neither pulse is sufficient alone to enable conduction of the transistors, but the combined pulses do enable conduction and hence capacitor charging. A delay line 75 such as a monostable multivibrator having a time constant at least as long as the longest possible pulse from the square pulse generators 68 and 69 plus the longest possible pulse from the generator 61 is provided so that a change in charge on the capacitor 74 can occur during the presence of a pulse from the generators 68 and 69 which, as previously described, commences at the end of the pulse from the generator 61. Thus for the current pulse generators 72 and 73 to provide a current pulse, both the pulse generator 61 and one of the square pulse generators 68 and 69 must have a signal thereon. By limiting conduction of the transistors to a short time period when signal pulses from the level detectors 56 and 57 may occur, transients and other extraneous noise on the capacitor 74 is minimized.

The output 26 from the photodetector 12 includes a recording system and alarm systems. In the recording system the output of the photo sensor 50 is applied directly to a D.C. amplifier 86, the output of which is applied to a recorder 87 after passing through a limiter 88 to prevent damage to the recorder. The recorder provides a permanent record of the light output of the photodetector as a function of time. A conventional strip chart recorder is found suitable for use herein. The gain of the amplifier 86 is regulated by the charge on the capacitor 74 to which it is connected through the emitter follower 76. The gain is decreased when the light output from the culture is high and increased when the light output is low so that the baseline from which deviations in light output may occur is normalized to a reasonably uniform value in the recording and alarm systems. Thus, due to repetitive cycling of the drift correction circuitry 27, the gain of the amplifier 86 is continually adjusted so that the output thereof remains substantially constant despite normal relatively slow variations in light output from the luminous organism. Variations in absolute light intensity due to aging of the culture and cumulative effects of repeated exposures to toxicant are normalized by the drift control 27 as hereinabove described. A rapid change in light output due to exposure to a toxicant is amplified and recorded since the drift correction system responds relatively slowly to these large changes.

The drift correction 27 operates repetitively with a preferred period of from about two to five seconds, with each repetition providing an increment of drift correction. The magnitude of the increment is dependent on the feedback relation between the charge on the capacitor and the photodetector output. The maximum drift correction increment is preferably less than the change in light intensity due to exposure of the culture to a toxicant so that there is no possibility of coincidental exposure and drift correction which could lead to failure to detect a toxicant. Even in the absence of such a limit on the magnitude of the drift correction, the change in luminous intensity due to exposure to a toxicant is rapid and it is quite improbable that it would exactly coincide with a drift correction cycle. If such coincidence should occur, it is extremely improbable that it should reoccur in the next sampling of the medium being monitored for the presence of a toxicant and detection of the toxicant is not delayed more than one repetition of the sampling cycle.

Similarly the output of the amplifier 86 is applied to an alarm circuit. It is desirable in the operation of a toxicant detector to provide a visual or audible alarm when the light intensity from the luminous culture is rapidly suppressed beyond some arbitrary value. The amount of suppression to be detected is a function of the relative sensitivty of the micro-organism to the suspected toxicant and the concentration level desired to be detected. There is therefore provided an adjustable reference voltage 92 which can be manually adjusted to provide an alarm at any selected suppression of light intensity. This reference voltage 92 is supplied to a differential amplifier 93 to which the amplifier 86 is also connected. The output of the differential amplifier 93 is applied to a trigger circuit 94 such as a Schmitt trigger which conducts at a preselected voltage level. The trigger is in turn connected to an alarm 96 which can, for example, be a light, a bell, or an oscillator and audio amplifier to provide a visual or audible alarm signal. A reset 97 is provided for resetting the alarm circuit for further operation of the detector.

The life of the culture has a limited useful time period due to normal aging or culture deterioration due to repeated injection of toxicants. It is found desirable to change cultures when the static light level has diminished to about 20 percent of the original intensity. This is readily determined continued measurement of the drift correction potential. For this purpose a trigger 98 is connected to the gain control signal from the emitter follower 76. The trigger is actuated when the drift correction voltage has some preselected relation to a reference voltage 99.

This trigger 98 actuates an alarm 100 which signals the need for a new culture in the toxicant detector.

In order to operate the toxicant detector provided according to the principles of this invention a luminous culture is prepared on a solid agar medium as has been described. This culture is preferably grown in a covered Petri dish for about one day to achieve maximum luminescence. A circular disk of the agar about three-fourths inch in diameter is removed from the Petri dish, conveniently with the aid of a cork borer. This disk is transferred to a micro-organism holder and placed in the chamber therein. The holder is covered with a strip of tape and is then in condition for use in the toxicant detector. As a matter of practice a number of micro-organism holders are usually prepared so that as the light intensity from the luminous culture diminishes, a new culture can be inserted into the instrument in a very short time. A micro-organism holder having a luminous culture thereon is inserted into the light-tight enclosure of the toxicant detector through a tight fitting aperture so that the luminous culture is adjacent the photodetector. Connection is made between the conduits and gas sampling system and clean humidified air is passed over the surface of the luminous culture for a short time to remove any toxic materials from the system and permit the culture to achieve a steady state of luminescence.

The gain of the amplifiers in the detector is adjusted to accommodate the light intensity of the culture employed. The drift correction circuitry provides a fine adjustment of the gain of the amplifiers and brings the toxicant detector to a useful condition in a short period of time. When the toxicant detector is operated automatically, the timer passes clean humidified air for a short time over the luminous culture, provides a small sample of medium being monitored for the presence of a toxicant, and then purges the system with clean humidified air. This cycle of sampling is periodically repeated at some preselected time interval such as, for example, one or two minutes. Any normal changes in the light output from the luminous culture are automatically normalized by the drift correction provided in the toxicant detector. Clean moist air passing over the culture makes little enough change in the light output that the drift correction circuitry adjusts the amplifier gain to compensate for the difference. By the same token if the sampled medium contains no toxicant, little change occurs in the light output from the luminous culture. On the other hand, if a toxicant is present in the sampled medium, the light output of the luminous culture is rapidly changed and if the change is greater than the preselected amount of alarm is activated.

When the light intensity from the luminous culture diminishes below some preselected amount either due to normal aging of the culture or diminished light output due to repeated exposure to toxicants, an alarm is activated indicating the necessity of changing the micro-organism holder to present a new luminous culture before the photodetector.

The following non-limiting examples are given to more fully illustrate some of the principles of this invention and to provide an appreciation of the advantages of the invention.

*Example 1*

A culture of *Photobacterium fischeri* was obtained from the American Type Culture Collection. This culture was maintained on an agar slant at about 5° C. to maintain its viability. Before exposing the culture to toxicants a fresh slant having a luminous culture was prepared by streaking a new agar slant with cells from the original agar slant. The inoculated slant was incubated at room temperature overnight and a loop full of the fresh culture was suspended in 10 milliliters of nutrient broth. Solid agar plates were inoculated with 0.5 milliliter aliquots of the broth suspension and incubated at room temperature. The nutrient broth comprises 5 grams peptone, 3 grams meat extract, 30 grams sodium chloride, 5 grams calcium carbonate, and 5 milliliters glycerol per liter of water. The solid agar plates had the same composition as the nutrient broth except that an additional 3% of plain agar was added to cause jelling of the nutrient medium.

Samples of air containing small concentrations of unsymmetrical dimethyl hydrazine (UDMH) were prepared and thoroughly homogenized by forcing the entire mixture back and forth through a small orifice several times. The gas samples having various concentrations of UDMH were passed over the surface of a culture of luminous micro-organisms on a solid nutrient substrate prepared as described.

Table I sets forth the relative intensity of light ($I_a$) from the luminous culture as measured with a photomultiplier, amplifier and recorder, after exposure to a sample of gas comprising air containing 3.2 parts per million of UDMH compared with the intensity ($I_b$) immediately before exposure. The agar plate employed for this series of tests was incubated at room temperature for 31 hours before exposure to the toxicant. In this series of tests the concentration of UDMH in air was maintained constant at 3.2 parts per million and successively larger quantities of this gas were passed over the luminous culture. Since the volume of the apparatus is constant and the flow rate of the gas through the chamber containing the agar plate is relatively uniform, the time of exposure of the luminous culture to the gas containing a toxicant is approximately proportional to the quantity of gas. Between each exposure of the culture to gas containing a toxicant the chamber containing the agar plate was purged with humidified clean air and the light intensity from the luminous culture was permitted to return to a new steady state value.

TABLE I.—EFFECT OF VARYING QUANTITY OF GAS

| Quantity of gas (ml.): | $I_a/I_b$ (percent) |
|---|---|
| 1 | 96.6 |
| 2 | 89.3 |
| 4 | 87.7 |
| 6 | 85.2 |
| 8 | 84.8 |
| 10 | 78.8 |
| 15 | 74.9 |
| 20 | 62.6 |
| 40 | 49.1 |

It is apparent from an examination of Table I that exposure of a luminous culture to successively larger samples of gas containing a given concentration of toxicant yields successively larger decreases in light intensity. It is also apparent that repeated exposure of the same culture to a toxicant does not permanently destroy its usefulness in subsequently detecting the same toxicant.

A series of exposures of a agar plate having a luminous culture of *Photobacterium fischeri* was made to demonstrate the effect of repeated exposure of a culture to a toxicant. An agar plate was prepared in the same manner as previously described and incubated at room temperature for 31 hours. The plate culture was then stored at −20° C. for three days in order to limit deterioration of the luminous culture. The plate was warmed at room temperature for three hours before testing. The frozen agar plate was warmed in contact with an adsorbent paper to remove condensed moisture.

Table II sets forth the light intensity values obtained when the luminous culture so prepared was exposed to successive exposures of gas containing UDMH. In each instance the agar plate was exposed to a total volume of ten milliliters of mixed gas comprising air containing UDMH in the concentration set forth in Table II. Between each exposure the chamber containing the agar plate was purged with clean humidified air to remove any traces of toxicant. The light intensity from the culture was recorded immediately before exposure of the culture to a toxicant and the minimum light intensity observed during or after exposure was also recorded. The units for the light intensity as set forth in Table II are arbitrary units indicating the relative output of a photomultiplier employed for measuring light intensity. The percentage light intensity after exposure $I_a$ relative to the light intensity before exposure $I_b$ is also set forth as a percentage in Table II.

TABLE II.—EFFECT OF REPEATED EXPOSURE TO UDMH

| Concentration of UDMH (p.p.m.) | Light Intensity (Arbitrary) | | $I_a/I_b$ (percent) | Average $I_a/I_b$ |
|---|---|---|---|---|
| | Before ($I_a$) | After ($I_b$) | | |
| 1.6 | 3.22 | 2.66 | 82.6 | |
| 1.6 | 3.23 | 2.67 | 82.7 | 83.2 |
| 1.6 | 3.20 | 2.70 | 84.4 | |
| 3.2 | 3.02 | 2.15 | 71.2 | |
| 3.2 | 2.93 | 2.05 | 69.9 | 70.7 |
| 3.2 | 2.87 | 2.04 | 71.1 | |
| 4.8 | 2.68 | 1.73 | 64.5 | |
| 4.8 | 2.57 | 1.64 | 63.8 | 63.8 |
| 4.8 | 2.46 | 1.55 | 63.0 | |
| 6.4 | 2.05 | 1.26 | 61.5 | |
| 6.4 | 1.93 | 1.18 | 61.2 | 61.4 |
| 6.4 | 1.76 | 1.08 | 61.4 | |

It is apparent from the data in Table II that the light intensity from the culture steadily decreases upon repeated exposure of the culture to a toxicant. It is also apparent that repeated exposure of the culture to gas containing a toxicant has not permanently impaired the ability of the culture to detect the presence of a toxicant. The data in Table II also indicate that increasing concentrations of toxicant in air give increasingly large inhibitions of luminous light intensity.

A number of other agar plates were exposed to gas containing small concentrations of UDMH to verify the limit of detectability of *Photobacterium fischeri* to UDMH. The various agar plates employed were subjected to various incubation and storage techniques to investigate the effect upon sensitivity. Cultures of luminous *Photobacterium fischeri* were prepared on agar plates as previously described and exposed to gas comprising air having a small concentration of UDMH. In each instance the culture was exposed to ten milliliters of gas. Table III sets forth the relative light intensity from the luminous culture after exposure to a toxicant ($I_a$) relative to light intensity immediately before exposure ($I_b$). Each value of light intensity change is the average of three individual exposures to gas containing a toxicant.

Plate No. 2, the data from which are set forth in Table III, was incubated at room temperature for 31 hours, stored for three days at −20° C., and warmed at room temperature in contact with absorbent paper for three hours before exposure. The data for plate No. 2 show good agreement with the data from a duplicate plate as is set forth in Table II. This verifies the repeatability of the data.

Plates No. 6 and 17 were each incubated at room temperature for 26 hours before exposure to toxicant. The data set forth in Table III for plates No. 6 and 17 were obtained with the plates at a temperature of 26° C. It is apparent from these data that this bacteria is sensitive to toxicant at temperatures somewhat above the temperature for optimum growth (about 22° C.).

Plates 10, 13, 19 and 22 were prepared as described above and incubated for 24 hours at room temperture. These plates were then stored at −20° C. for varying time periods to investigate the storability of the cultures. Before exposure to toxicant the cultures were warmed to room temperature and incubated an additional 24 hours. Plate No. 13 was stored 3 days at −20° C., plate No. 22 was stored 4 days and plate No. 19 was stored 5 days. Plate No. 10 was stored at −20° C. for 23 days and at the end of that time was incubated 48 hours at room temperature before exposure to gas containing UDMH.

TABLE III.—EFFECT OF CONCENTRATION OF TOXICANT

| Plate No. | Concentration of UDMH (p.p.m.) | $I_a/I_b$ (percent) |
|---|---|---|
| 2 | 1.6 | 86.6 |
| | 3.2 | 81.3 |
| | 4.8 | 75.1 |
| | 6.4 | 77.6 |
| 6 | 1.6 | 96.0 |
| | 3.2 | 87.8 |
| | 4.8 | 85.6 |
| | 6.4 | 75.7 |
| 17 | 1.6 | 94.9 |
| | 3.2 | 90.6 |
| | 4.8 | 83.1 |
| | 6.4 | 76.1 |
| 13 | 1.6 | 91.4 |
| | 3.2 | 81.4 |
| | 4.8 | 75.5 |
| | 6.4 | 71.0 |
| 22 | 1.6 | 93.8 |
| | 3.2 | 86.0 |
| | 4.8 | 79.1 |
| | 6.4 | 73.7 |
| | 12.8 | 66.1 |
| 19 | 1.6 | 95.6 |
| | 3.2 | 90.5 |
| | 4.8 | 87.5 |
| | 6.4 | 86.8 |
| | 12.8 | 84.8 |
| 10 | 3.2 | 96.1 |
| | 4.8 | 91.5 |
| | 6.4 | 76.3 |
| | 12.8 | 67.7 |

It can be seen from the data in Table III that no substantial change occurred in the sensitivity of the culture to UDMH after storage for periods of 3, 4 and 5 days. Thus, storage for this period is entirely practical for maintaining cultures for use in a toxicant detector. Plate No. 10 showed no change in light intensity upon exposure to air containing 1.6 p.p.m. UDMH. Data for higher concentrations of UDMH are set forth in Table III. It is apparent from this data that prolonged freezing of a luminous culture decreases the sensitivity to UDMH, however, substantial sensitivity remains and the culture is still useful as a toxicant detector.

*Example 2*

The limit of detectability of various materials by a luminous culture of *Photobacterium fischeri* was investigated. Luminous cultures of bacteria were prepared in the manner described above on an agar substrate of the type described. These cultures were incubated at room temperature for 18–36 hours before exposure to air containing a small concentration of toxicant. Table IV sets forth the limit of detection for various materials tested. The limit of concentration is expressed in parts per million of toxicant in air.

TABLE IV.—LIMIT OF DETECTION OF VARIOUS MATERIALS

| Chemical: | Limit of concentration detectable, p.p.m. |
|---|---|
| Unsymmetrical dimethyl hydrazine | 1.6 |
| Monomethyl hydrazine | 0.1 |
| Anhydrous hydrazine | 1.0 |
| JP–4 (jet fuel) | 5.0 |
| Methyl parathion | 0.1 |
| $H_2S$ | 10,000 |
| $SO_2$ | 4,600 |
| HCN | 1.5 |
| $Cl_2$ | 0.002 |
| $HNO_3$ | 10 |
| $NH_4OH$ | 25 |
| Diethyl ether | 20 |
| Acetone | 30 |
| Methyl propyl ketone | 110 |
| n-Propyl aldehyde | 1,700 |
| Isobutyl aldehyde | 1,300 |
| Butyral aldehyde | 1,400 |

| Chemical: | Limit of concentration detectable, p.p.m. |
|---|---|
| Methyl alcohol | 61,000 |
| Ethyl alcohol | 2,100 |
| n-Propyl alcohol | 1,600 |
| Isopropyl alcohol | 8,160 |
| Isobutyl alcohol | 130 |
| Isoamyl alcohol | 45 |

It can be seen from these data that luminous bacteria are quite sensitive to low concentrations of many materials that are toxic. The limit of detectability is in most instances less than the level that will produce toxic symptoms in man. The limit of detectability was determined by exposure of the luminous culture to air containing the toxicant at a series of concentrations to determine the concentration level at which a small but measurable reduction in light intensity was observed. For this purpose a reduction of from 5 to 10 percent light intensity was considered as readily detectable.

Example 3

A culture of *Armillaria mellea*, a luminous fungus, was obtained from the American Type Culture Collection. This fungus was grown in a nutrient broth comprising 10 percent bread crumb in water. The culture was incubated at room temperature for ten days before exposure to toxicant. The described nutrient is a broth having the fungus suspended therein. The broth was filtered through a millipore filter and the solid filter pad was placed before the photodetector in lieu of the solid agar medium previously described. The fungus on the filter pad was exposed to chlorine gas to determine the limit of detectability and it was found that from 5 to 10 percent decrease in light output was obtained with as little as 0.02 part per million chlorine gas in air. In a similar manner it was determined that as little as 0.10 part per million of UDMH was detectable when using *Armillaria mellea*.

It is to be understood that the above description of a preferred embodiment and described examples are merely illustrative of the principles of this invention. Those skilled in the art may readily devise other variations that will embody the principles of the invention. It is therefore to be understood that within the scope of the appended claims the invention may be practiced otherwise than as specifically described.

What is claimed is:

1. A method of monitoring air for the presence of toxicant comprising:
   passing air suspected of containing a toxicant distributed therein over the surface of a culture of aerobic luminous micro-organisms; and
   sensing the relation of luminous light output from said culture after exposure to the air to luminous light output from said culture before exposure to the air.

2. A method of monitoring air for the presence of toxicant comprising:
   growing a culture of aerobic luminous micro-organisms on the surface of a solid nutrient medium;
   sensing a first light output from said culture;
   exposing said culture to air suspected of containing a toxicant distributed therein;
   sensing a second light output from said culture after first exposing said culture to the suspected air; and
   comparing the first light output with the second light output.

3. A method of detecting the presence of toxicant in air comprising the steps of:
   intermittently exposing aerobic luminous organisms to air that is to be monitored for presence of toxicant;
   intermediate each such exposure, exposing the organism to moist air known to be free of toxicant; and
   detecting light emitted by said organisms.

4. A toxicant detector comprising:
   a culture of luminous organisms on a solid substrate;
   means for exposing said culture to air that may contain a toxicant;
   a photosensor adjacent said culture;
   means for detecting a change in photosensor output; and
   means for indicating the change in output.

5. A detector as defined in claim 4 wherein said means for detecting includes a signal normalizing system comprising:
   amplifier means for amplifying a signal that is subject to drift;
   generator means for repetitively synchronously generating a positive going ramp and a negative going ramp, both of said ramps converging toward the signal;
   comparator means for sensing coincidence of said ramps and the amplified signal;
   a capacitor;
   means for selectively partially charging and partially discharging said capacitor in response to said comparator means; and
   feedback means for adjusting the gain of said amplifier means in response to the state of charge of said capacitor.

6. A toxicant detector comprising:
   a light-tight enclosure;
   a culture of luminous organisms on a solid substrate in said light-tight enclosure;
   a photo sensor in said light tight enclosure;
   means for exposing said culture to air having a high relative humidity;
   means for exposing said culture to a medium to be sampled;
   means for indicating the output of said photo sensor; and
   drift correction means for compensating for normal slow changes in light intensity from said culture.

7. A detector as defined in claim 6, wherein said drift correction means comprises:
   amplifier means for amplifying the photosensor output which is subject to drift;
   means for repetitively generating a positive going voltage ramp;
   means for repetitively generating a negative going voltage ramp, said positive going voltage ramp and negative going voltage ramp each synchronously converging toward the amplified output;
   comparator means for stopping said means for generating voltage ramps when one of said voltage ramps is equal to the amplified output and for detecting which of said voltage ramps is equal to the amplified output;
   a storage capacitor;
   a first current pulse means for changing the state of charge on said capacitor in one sense when said positive going voltage ramp is equal to the amplified output;
   a second current pulse means for changing the state of charge on said capacitor in the opposite sense when said negative going voltage ramp is equal to the amplified output; and
   feedback means for adjusting the gain of said amplifier means in response to the state of charge of said capacitor.

8. A toxicant detector comprising:
   a light tight enclosure;
   a culture of luminous micro-organisms in said light tight enclosure;
   a photo sensor adjacent said culture in said light tight enclosure;
   means for selectively exposing said culture to a gaseous medium to be sampled for the presence of a toxicant;
   self-correcting means for adjusting the output of said photo sensor for compensating for relatively slower changes in luminous light intensity from said culture;

means for indicating a relatively faster change in luminous light intensity from said culture exceeding a preselected value.

9. A detector as defined in claim 8 wherein said photosensor provides a detection signal representative of the luminous light intensity to be monitored:
a source of reference signal;
means for comparing the reference signal with the detection signal to provide an output signal;
means for repetitively generating a pair of synchronously and oppositely varying ramp signals;
comparison means for detecting coincidence of the magnitude of the detection signal with said ramp signals; and
means responsive to the comparison means for adjusting the magnitude of the detection signal.

10. A toxicant detector comprising:
a closed container;
a culture of luminous micro-organisms in said closed container;
means for sensing intensity of light from the luminous culture; and
means for selectively and alternatively passing clean humidified air and air to be monitored for presence of a toxicant through said closed container.

11. A detector as defined in claim 10 wherein said means for passing comprises:
conduits for admitting fluid to the container and for exhausting fluid from the container;
first and second normally closed valves in said conduits for isolating the container;
a pump connected to said first valve for exhausting fluid from the container;
a normally open valve connected to said second valve, said normally open valve communicating with a source of clean fluid;
a biased check valve connected to said second valve for opening in response to a pressure drop, said check valve communicating with a source of fluid that may contain a foreign material; and
means for selectively sequentially operating said normally closed valves and said normally open valve.

12. A toxicant detector as defined in claim 10 wherein said means for selectively and alternatively passing further comprises:
a vacuum pump for drawing air from said container;
a first valve for admitting clean air having a high relative humidity to said container; and
a second valve for admitting air to be monitored for presence of a toxicant to said container; one of said first and second valves being responsive to pressure in said container.

13. A toxicant detector comprising:
a light-tight enclosure;
a culture of luminous micro-organisms on a solid substrate in said light-tight enclosure;
a photo sensor adjacent said culture in said light-tight enclosure;
a light baffling gas conduit for passing gas through said light-tight enclosure and exposing said culture to the gas;
means connected to said gas conduit for supplying air having a high relative humidity to said culture;
means connected to said conduit for supplying air to be monitored for presence of a toxicant to said culture;
means for alternatively selecting said air having a high relative humidity and said air to be monitored for exposure to said culture.

14. A toxicant detector as defined in claim 13 wherein said means for alternatively selecting further comprises:
valves for isolating said culture;
a valve for admitting the air having a high relative humidity;
a valve for admitting air to be monitored for presence of a toxicant; and
timer means for sequentially operating said valves.

15. Toxicant detection apparatus comprising:
a sealed opaque chamber;
a substrate within the chamber;
a culture of luminous organisms on said substrate;
means for alternately and repetitively introducing into the chamber air to be monitored for the presence of toxicants and air known to be free of toxicants; and
means for monitoring variation of light emitted by the micro-organisms.

16. An apparatus as defined in claim 15 wherein said means for monitoring variation of light comprises:
means for providing a detection signal representative of light emitted by the micro-organisms;
a source of reference signal;
means for comparing the reference signal with the detection signal to provide an output signal;
an alarm responsive to the output signal;
means for repetitively generating a pair of synchronously and oppositely varying ramp signals;
comparison means for detecting coincidence of the magnitude of the detection signal with said ramp signals; and
means responsive to the comparison means for adjusting the magnitude of the detection signal.

17. A method of monitoring air for the presence of toxicant comprising the steps of:
growing a culture of aerobic luminous micro-organisms on the surface of a solid nutrient medium;
sensing a first light output from said culture;
generating a first signal representative of said first light output from said culture;
normalizing said first signal to a level independent of drift of said first light output;
passing air monitored for presence of a toxicant distributed therein over the surface of said culture;
sensing a second light output from said culture after said passing step;
generating a second signal related to said second light output and to the normalized first signal; and
sensing the relation of said second signal to said first signal.

18. An apparatus for monitoring air for the presence of a toxicant comprising:
a culture of aerobic luminous micro-organisms on the surface of a solid substrate;
means for sensing a first light output from said culture;
means for repetitively generating a positive going voltage ramp;
means for repetitively generating a negative going voltage ramp converging toward said positive going ramp and synchronized with said positive going ramp;
means for generating a first voltage signal corresponding to said first light output, said first signal normally being between said positive going ramp and said negative going ramp;
means for stopping both of said voltage ramps when one of said voltage ramps has a magnitude equal to the magnitude of said first voltage signal;
means for detecting which of said voltage ramps is equal to said first voltage signal;
a capacitor;
means for selectively partially charging and partially discharging said capacitor in response to said means for detecting;
means for adjusting said first voltage signal in response to the state of charge of said capacitor;
means for passing air that may contain a toxicant distributed therein over the surface of said culture of luminous micro-organisms;

means for sensing a second light output from said culture after passing the air over said culture;

means for generating a second voltage signal corresponding to said second light output and to the state of charge of the capacitor; and means for sensing the relation of said second voltage signal to said first voltage signal.

19. A sample chamber for a toxicant detection apparatus for detection of foreign materials in a fluid comprising:
   a sealed opaque chamber;
   a solid nutrient medium within said chamber;
   a culture of aerobic luminous micro-organisms on said solid medium;
   ports in the chamber for intake and exhaust of gaseous material; and
   an optical window in the chamber for passing light from the culture to the exterior of the chamber for illuminating a light detector of the toxicant detection apparatus.

20. A micro-organism holder for an apparatus for detecting toxicants in a fluid comprising:
   a substantially rectangular plate;
   means forming a cavity in said plate for receiving a solid medium having a luminous culture of micro-organisms thereon;
   a plurality of light baffling gas conduits communicating with the cavity;
   connector means connected to said conduits for admitting gas thereto; and
   a transparent cover for the cavity for preventing gas leakage therefrom.

21. A toxicant detector comprising:
   a culture of luminous micro-organisms;
   a photo sensor adjacent said culture of luminous micro-organisms;
   amplifier means for amplifying the output of said photo sensor;
   generator means for repetitively generating a positive going voltage ramp;
   means for generating a negative going voltage ramp synchronous with said positive going voltage ramp and converging toward said positive going voltage ramp, the amplified output of said photo sensor normally being between said converging voltage ramps;
   detector means for providing an output signal when the magnitude of said converging voltage ramps equals the magnitude of the amplified photo sensor output;
   means for stopping both of said voltage ramps when one of said voltage ramps is equal to the amplified photodetector output;
   a storage capacitor;
   first current means for partially charging said capacitor when the first voltage ramp is equal to the amplified photo sensor output;
   second current means for partially discharging said capacitor when the second voltage ramp is equal to the amplified photo sensor output;
   feedback means for adjusting the gain on said amplifier means in response to the state of charge of said capacitor; and
   means for detecting a relatively rapid change in the photo sensor output.

22. A toxicant detector comprising:
   a light tight enclosure;
   a micro-organism holder extending into said light tight enclosure including a substantially flat plate having a cavity therein, light baffling channels communicating with the cavity, and a transparent cover for the cavity for preventing gas leakage therefrom;
   a culture of aerobic luminous micro-organisms on a solid culture medium in the cavity adjacent the transparent cover;
   a photo sensor in said light tight enclosure adjacent the transparent cover and on the opposite side thereof from said culture for sensing light output from said luminous culture;
   small diameter intake and exhaust conduits communicating with the channels in said micro-organism holder for admitting air thereto and exhaustion air therefrom;
   a vacuum pump for exhausting air from said exhaust conduit;
   a normally closed first valve means between the pump and said exhaust conduit;
   a source of clean air;
   a humidifier for humidifying the clean air;
   normally open second valve means for admitting the humidified clean air to said conduits;
   check valve means for admitting air suspected of containing a toxicant distributed therein to said conduits;
   a normally closed third valve means between the check valve means and the intake conduit;
   a timer for sequentially actuating said valve means to open the first and third valve means and subsequently close the second valve means for alternatively selecting the humidified air and the air suspected of containing a toxicant distributed therein;
   an amplifier for amplifying the output of said photo sensor;
   a pulse generator for periodically generating a square pulse of indefinite length;
   a ramp generator for generating a positive going voltage ramp in response to the square pulse;
   a first level detector connected to said ramp generator and also connected to said amplifier for comparing said positive going ramp with the amplified photo sensor output and for providing a signal pulse when said positive going ramp is equal to the amplified photo sensor output;
   a phase inverter connected to said ramp generator for generating a negative going voltage ramp converging toward said positive going voltage ramp and synchronized therewith, the starting voltage of said negative going voltage ramp being greater than the amplified photo sensor output and the starting voltage of the positive going voltage ramp being less than the amplified photo sensor output;
   a second level detector connected to said phase inverter and also connected to the amplifier for comparing said negative going ramp with the amplified photo sensor output and providing a signal pulse when said negative going ramp is equal to the amplified photo sensor output;
   an OR circuit responsive to either of said level detectors for terminating the square pulse from said pulse generator;
   a storage capacitor;
   a differential amplifier for amplifying the difference between the state of charge on said storage capacitor and the output of said photo sensor;
   a first current pulse generator for providing a pulse of current to said capacitor for changing the state of charge of said capacitor in one sense;
   a first square pulse generator responsive to said first level detector for generating a first pulse for enabling said first current pulse generator for the duration of the first pulse;
   a second current pulse generator for providing a pulse of current to said capacitor for changing the state of charge of said capacitor in the opposite sense;
   a second square pulse generator responsive to said second level detector for generating a second pulse for enabling said second current pulse generator for the duration of the second pulse, each of said first and second square pulse generators being responsive to said differential amplifier for generating a relatively longer pulse when the difference is relatively larger and generating a relatively shorter pulse when the difference is relatively smaller;

a delay connection between said pulse generator and said current pulse generators for enabling said current pulse generators only during a time related to the operation of said pulse generator;

a feedback connection between said storage capacitor and said amplifier for adjusting the gain of said amplifier in response to the state of charge of said capacitor for periodically normalizing the photo sensor output; and an output circuit for indicating the photo sensor output.

23. A signal normalizing system comprising:

amplifier means for amplifying a signal that is subject to drift;

generator means for repetitively synchronously generating a positive going ramp and a negative going ramp, both of said ramps converging toward the signal;

comparator means for sensing coincidence of said ramps and the amplified signal;

a capacitor;

means for selectively partially charging and partially discharging said capacitor in response to said comparator means; and feedback means for adjusting the gain of said amplifier means in response to the state of charge of said capacitor; and wherein said means for selectively partially charging and partially discharging said capacitor comprises:

means for generating a pulse of current for partially charging said capacitor in response to said comparator means;

means for generating a pulse of current for partially discharging said capacitor in response to said comparator means;

means for comparing the signal that is subject to drift and the charge on said capacitor; and means for regulating the length of the pulse of current for charging and the pulse of current for discharging in response to said means for comparing.

24. A signal normalizing system comprising:

amplifier means for amplifying a signal that is subject to drift;

means for repetitively generating a positive going voltage ramp;

means for repetitively generating a negative going voltage ramp, said positive going voltage ramp and negative going voltage ramp each synchronously converging toward the amplified signal;

comparator means for stopping said means for generating voltage ramps when one of said voltage ramps is equal to the amplified signal and for detecting which of said voltage ramps is equal to the amplified signal;

a storage capacitor;

a first current pulse means for changing the state of charge on said capacitor in one sense when said positive going voltage ramp is equal to the amplified signal;

a second current pulse means for changing the state of charge on said capacitor in the opposite sense when said negative going voltage ramp is equal to the amplified signal;

feedback means for adjusting the gain of said amplifier means in response to the state of charge of said capacitor;

a differential amplifier for amplifying the difference between the state of charge of said capacitor and the magnitude of the signal that is subject to drift; and pulse generator means for regulating the length of current pulse from said first and second current pulse means, said pulse generator means being responsive to said differential amplifier for generating a relatively longer pulse when the difference is relatively longer and generating a relatively shorter pulse when the difference is relatively smaller.

References Cited

UNITED STATES PATENTS

| | | | |
|---|---|---|---|
| 2,710,397 | 7/1955 | Foster | 324—99 XR |
| 3,027,305 | 3/1962 | Freeman | 195—127 |
| 3,065,669 | 11/1962 | Orsi | 88—145 |
| 3,260,912 | 7/1966 | Gregory | 330—9 XR |

RALPH G. NILSON, *Primary Examiner.*

J. D. WALL, *Assistant Examiner.*

UNITED STATES PATENT OFFICE
CERTIFICATE OF CORRECTION

Patent No. 3,370,175            February 20, 1968

Albert L. Jordon et al.

It is certified that error appears in the above identified patent and that said Letters Patent are hereby corrected as shown below:

Column 2, lines 8 and 9, after "photodetector" insert -- voltage. The state of charge on the capacitor is coupled to a photodetector --; line 70, "Mycena" should read -- Mycena --. Column 4, lines 36 and 37, "luminou" should read -- luminous --. Column 10, line 75, "pulse" should read -- pulses --. Column 11, line 8, after "tion" insert -- and rectification --; line 56, "siutably" should read -- suitably --. Column 12, line 1, "draft" should read -- drift --. Column 13, line 6, "68", second occurrence, should read -- 69 --.

Signed and sealed this 9th day of September 1969.

(SEAL)

Attest:

Edward M. Fletcher, Jr.            WILLIAM E. SCHUYLER, JR.

Attesting Officer            Commissioner of Patents